US009191371B2

(12) United States Patent
Chang et al.

(10) Patent No.: US 9,191,371 B2
(45) Date of Patent: Nov. 17, 2015

(54) NETWORK CODING-BASED ANONYMOUS COMMUNICATION

(71) Applicant: CALIFORNIA INSTITUTE OF TECHNOLOGY, Pasadena, CA (US)

(72) Inventors: Christopher S. Chang, Seoul (KR); Tracey C. Ho, Pasadena, CA (US); Michelle Effros, Pasadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 28 days.

(21) Appl. No.: 14/193,984

(22) Filed: Feb. 28, 2014

(65) Prior Publication Data

US 2014/0250301 A1  Sep. 4, 2014

Related U.S. Application Data

(60) Provisional application No. 61/772,421, filed on Mar. 4, 2013.

(51) Int. Cl.
*H04L 9/32* (2006.01)
*H04L 29/06* (2006.01)
*H04L 29/08* (2006.01)
*H04L 12/715* (2013.01)

(52) U.S. Cl.
CPC ............ *H04L 63/0407* (2013.01); *H04L 63/18* (2013.01); *H04L 45/64* (2013.01); *H04L 67/104* (2013.01)

(58) Field of Classification Search
None
See application file for complete search history.

(56) References Cited

U.S. PATENT DOCUMENTS

| 2007/0174471 | A1* | 7/2007 | Van Rossum | 709/229 |
| 2011/0235799 | A1* | 9/2011 | Sovio et al. | 380/30 |
| 2011/0238985 | A1* | 9/2011 | Sovio et al. | 713/168 |

OTHER PUBLICATIONS

D. Chaum, "Untraceable electronic mail, return addresses, and digital pseudonyms," *Communications of the ACM*, vol. 24, No. 2, pp. 84-90, 1981, (5 pages as provided).
M. Reed, P. Syverson, and D. Goldschlag, "Anonymous connections and onion routing," *IEEE JSAC*, vol. 16, No. 4, pp. 482-494, 1998.
R. Dingledine, N. Mathewson, and P. Syverson, "Tor: The second-generation onion router," in *Proceedings of the 13th Conference on USENIX Security Symposium*, p. 21, 2004, (17 pages as provided).
M. Freedman and R. Morris, "Tarzan: A peer-to-peer anonymizing network layer," in *Proceedings of the 9th ACM CCS*, pp. 193-206, 2002.
M. Rennhard and B. Plattner, "Introducing MorphMix: peer-to-peer based anonymous Internet usage with collusion detection," in *Proceedings of the ACM Workshop on Privacy in the Electronic Society*, pp. 91-102, 2002, (13 pages as provided).
A. Nambiar and M. Wright, "Salsa: a structured approach to large-scale anonymity," in *Proceedings of the 13th ACM CCS*, pp. 17-26, 2006.

(Continued)

*Primary Examiner* — Kaveh Abrishamkar
(74) *Attorney, Agent, or Firm* — Steinfl & Bruno LLP

(57) ABSTRACT

A computer-based peer-to-peer anonymous networking using a coding scheme with a formal information theoretic security characterization to construct a corresponding overlay subgraph is presented. A code construction based on linear coding which can be used for data transfer in an anonymous network is also presented. Various performance and simulation of the presented codes are provided in the Annex A1 which makes part of the present disclosure.

30 Claims, 13 Drawing Sheets

(56) References Cited

OTHER PUBLICATIONS

J. McLachlan, A. Tran, N. Hopper, and Y. Kim, "Scalable onion routing with torsk," in *Proceedings of the 16th ACM CCS*, pp. 590-599, 2009.

M. Reiter and A. Rubin, "Crowds: Anonymity for web transactions," *ACM Transactions on Information and System Security*, vol. 1, No. 1, pp. 66-92, 1998, (27 pages as provided).

A. Mislove, G. Oberoi, A. Post, C. Reis, P. Druschel, and D. Wallach, "Ap3: Cooperative, decentralized anonymous communication," in *Proceedings of the 11th Workshop on ACM SIGOPS European Workshop*, p. 30, 2004, (6 pages as provided).

S. Katti, D. Katabi, and K. Puchala, "Slicing the onion: Anonymous routing without pki," in *ACM HotNets*, 2005, (6 pages as provided).

Y. Fan, Y. Jiang, H. Zhu, J. Chen, and X. Shen, "Network coding based privacy preservation against traffic analysis in multi-hop wireless networks," *IEEE Transactions on Wireless Communications*, vol. 10, No. 3, pp. 834-843, 2011.

P. Gasti, A. Merlo, G. Ciaccio, and G. Chiola, "On the integrity of network coding-based anonymous p2p file sharing networks," in *Proceedings of the 9th IEEE International Symposium on Network Computing and Applications (NCA)*, pp. 192-197, 2010.

J. Wang, J. Wang, C. Wu, K. Lu, and N. Gu, "Anonymous communication with network coding against traffic analysis attack," in *Proceedings of IEEE International Conference on Computer Communications (INFOCOM)*, pp. 1008-1016, 2011.

M. Castro, P. Druschel, A. Kermarrec, and A. Rowstron, "Scribe: A large-scale and decentralized application-level multicast infrastructure," *IEEE JSAC*, vol. 20, No. 8, pp. 1489-1499, 2002.

M. Castro, P. Druschel, A. Ganesh, A. Rowstron, and D. Wallach, "Secure routing for structured peer-to-peer overlay networks," *ACM SIGOPS Operating Systems Review*, vol. 36, No. SI, pp. 299-314, 2002.

C. Diaz, S. Seys, J. Claessens, and B. Preneel, "Towards measuring anonymity," in *Proceedings of the 2nd International Conference on Privacy Enhancing Technologies*, pp. 54-68, 2002, (15 pages as provided).

A. Serjantov and G. Danezis, "Towards an information theoretic metric for anonymity," in *Proceedings of the 2nd International Conference on Privacy Enhancing Technologies*, pp. 259-263, 2002, (14 pages as provided).

C. Chang, *Applications of Coding in Network Communications*. PhD thesis, California Institute of Technology, 2012, (154 pages as provided).

S. Y. R. Li, R. W. Yeung, and N. Cai, "Linear network coding," *IEEE Transactions on Information Theory*, vol. 49, No. 2, pp. 371-381, 2003.

R. Koetter and M. Médard, "An algebraic approach to network coding," *IEEE/ACM Transactions on Networking*, vol. 11, No. 5, pp. 782-795, 2003.

T. Ho, M. Médard, R. Koetter, D. R. Karger, M. Effros, J. Shi, and B. Leong, "A random linear network coding approach to multicast," *IEEE Transactions on Information Theory*, vol. 52, No. 10, pp. 4413-4430, 2006.

\* cited by examiner

NETWORK CODING-BASED ANONYMOUS
COMMUNICATION

CROSS REFERENCE TO RELATED APPLICATIONS

The present application claims priority to U.S. provisional Patent Application Ser. No. 61/772,421, filed on Mar. 4, 2013, for "Network Coding-Based Anonymous Communication", which is herein incorporated by reference in its entirety.

STATEMENT OF GOVERNMENT GRANT

This invention was made with government support under N66001-11-C-4003 awarded by the Defense Advanced Research Projects Agency and the Space and Naval Warfare Systems Center Pacific. The government has certain rights in the invention.

Throughout the present disclosure reference will be made to the enclosed Annex A1 which makes part of the present disclosure.

BACKGROUND

Technical Field

The present disclosure relates to methods and algorithms related to the field of network communication and distributed network architectures as used, for instance, in peer-to-peer networking. In particular, the present disclosure presents novel network coding techniques to be used for networked anonymous communication in peer-to-peer (P2P) overlay networks, which can prevent participating nodes from identifying the communicating nodes, wherein an unknown number of participating nodes are adversarial nodes which can collude (e.g. with the goal to identify a sender and/or a receiver node). The proposed network coding can improve the performance and reliability of such communication.

One aspect considered by various embodiments according to the present disclosure is an anonymous subgraph setup in the absence of a reliable public key infrastructure (PKI), wherein a sender constructs a layered subgraph over which coding is performed using a novel coding scheme, latter coding scheme having a formal information theoretic security characterization, such as, for example, a mutual information between an adversary's observation and information that a sender is trying to protect is of a known and calculable value, and can be made to be zero or a value very close to zero. Such use of a code with formal information theoretic security characterization being a distinguishing feature from the prior art implementation known as the "slicing onion" scheme proposed by Katti et al. Teachings according to the present disclosure also consider optimization of protocol parameters used in the proposed subgraph setup such as to maximize an adversary's uncertainty, as measured, for example, by the entropy of the source and sink identities, and propose a randomized strategy which can improve anonymity and resource usage efficiency.

Another aspect of the various teachings according to the present disclosure focuses on a data transmission phase, assuming availability of a subgraph setup scheme (either PKI-based or coding-based as per the first aspect of the present disclosure) and end-to-end encryption. Basically this aspect of the present disclosure presents an efficient communication protocol for the defined subgraph. Such teachings use network coding at intermediate nodes of a corresponding networked communication system to improve networking performance and reduce complexity by replacing computationally expensive cryptographic operations at each hop of the network with simpler linear algebra operations.

SUMMARY

According to a first aspect of the present disclosure, computer-based method for constructing an overlay subgraph is presented, the computer-based method comprising: providing a set of available computer-based relay nodes communicating over a plurality of transmit and/or receive links; selecting, via a computer-based source, a random subset of the available computer-based relay nodes; based on the selecting, arranging, via the computer-based source, the selected computer-based relay nodes into an overlay subgraph, comprising a plurality of layers of width larger than or equal to two; based on the selecting and the arranging, creating, via the computer-based source, a message for each computer-based relay node, wherein the message comprises information particular to the each computer-based relay node; based on the creating, generating, via the computer-based source, a first layer coded packets; based on the generating, transmitting, through the subgraph, coded packets of a same size to the plurality of layers of the overlay subgraph; based on the transmitting, decoding the message for each computer-based relay node of the overlay subgraph via the each computer-based relay node; wherein a mutual information between an observation of a computer-based relay node of the overlay subgraph and information of a message not intended for said computer-based node is small or of calculable value.

According to second aspect of the present disclosure, a computer-based method for data transfer over an overlay subgraph of computer-based nodes is presented, the method comprising: providing an overlay subgraph of length l comprising a plurality of computer-based relay nodes arranged in l layers and communicating over a plurality of transmit and/or receive links, wherein each computer-based relay node of a layer i of the l layers shares a same secret random seed of l different random seeds with a computer-based source node; generating, via the computer-based source node, an invertible matrix $A_i$ based on the same secret random seed for each layer i of the l layers, wherein the invertible matrix $A_i$ is different for each layer i; preprocessing, via the computer-based source node, a sink message for a computer-based sink node at the last layer l of the l layers, by right-multiplying the sink message with matrix product $A_l^{-1} A_{l-1}^{-1} \ldots A_2^{-1} A_1^{-1}$ and obtaining a preprocessed sink message as a result; dividing, via the computer-source node, the preprocessed message into a plurality of packets and appending network coding headers comprising network coding operations associated to linear coding to each packet of the plurality of packets; and based on the appending, transmitting, through the l layers of the overlay subgraph the plurality of packets using linear coding at each layer, wherein each computer-based relay node of a layer i performs the linear coding and right-multiplies its received packets by the matrix $A_i$.

According to third aspect of the present disclosure, a computer-based communication network for anonymous peer-to-peer (P2P) communication is presented, the computer-based communication network comprising: a computer-based source configured to communicate with a plurality of computer-based nodes of the computer-based communication network via a plurality of transmit and/or receive links, wherein: the computer-based source is configured to execute a coding algorithm to generate a plurality of messages used to construct an overlay subgraph of nodes of width larger than two based on a randomly selected subset of computer-based relay nodes from the plurality of computer-based nodes, wherein messages are provided to the randomly selected subset of computer-based relay nodes via transmitted packets through the plurality of transmit and/or receive links, such as a mutual information between an observation of a computer-based node of the plurality of computer-based nodes and part of information of a message from the plurality of messages not intended for said computer-based node is zero.

DETAILED DESCRIPTION

Description of the Prior Art

The goal of anonymous networking is to hide the identities of communicating nodes. Applications of anonymous networking may include electronic voting, military communications, and communications of a sensitive commercial or political nature.

Many anonymous networking systems that rely on a public key infrastructure (PKI) have been proposed, starting from the seminal work of Chaum (e.g. [1] of Annex A1) on mix networks, to the "onion routing" approach of Reed et al. (e.g. [2] of Annex A1) and the Tor protocol (e.g. [3] of Annex A1) which is the most widely used anonymous networking system currently. In a public key infrastructure, the public keys of intermediate relay nodes are used to recursively encrypt information at the source, and in turn each relay node decrypts a layer of information using its private key. A number of anonymous networking proposals have also focused on P2P overlay networks, as the decentralized nature of P2P systems (e.g. not relying on a central server) and their potential to scale to a large number of participating nodes are attractive for various scenarios. Such proposed schemes include Tarzan (e.g. [4] of Annex A1) which describes a P2P networking system based on the onion routing scheme, MorphMix (e.g. [5] of Annex A1) which is similar to Tarzan but where the routes are determined by intermediaries, Salsa (e.g. [6] of Annex A1) and Torsk (e.g. [7] of Annex A1) which propose structured approaches to build scalable P2P anonymous networks requiring a reliable public key infrastructure.

Figure 1:
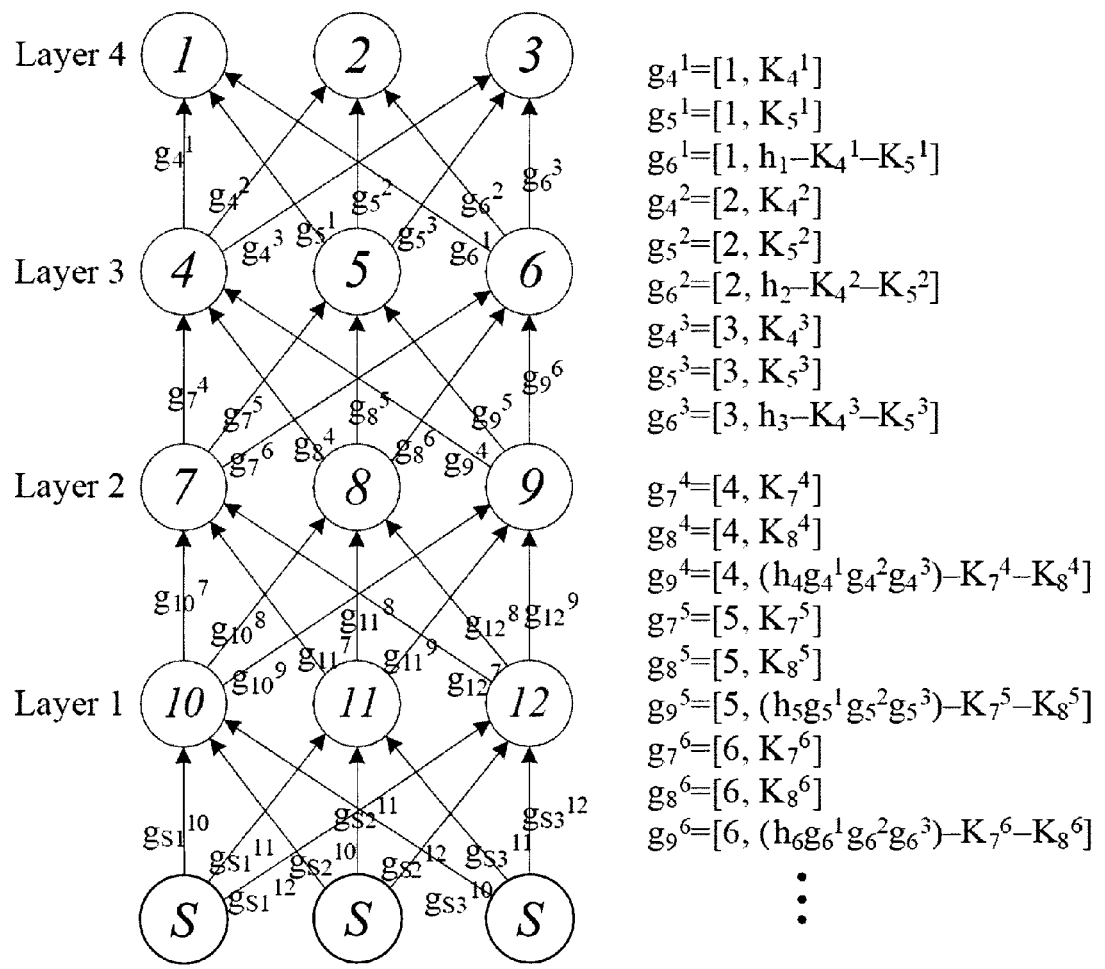
FIG. 1 shows an exemplary rectangular subgraph with length of 4 and width of 3. Associated subgraph packets and their content as per an embodiment of the present disclosure for creating the subgraph for anonymous communication are also includes. $K_i^j$ denotes an independent random vector of symbols from a finite field $\mathbb{F}$. The message for each node consists of (a last-hop flag $\psi_j$, a sink-flag $\phi_j$, a secret $\theta_j$, and the packets to be forwarded), where $h_j=(\psi_j, \phi_j, \theta_j)$. Note that $\psi_i=1$ if i=1, 2, 3 and $\psi_i=0$ otherwise.
Figure 2:
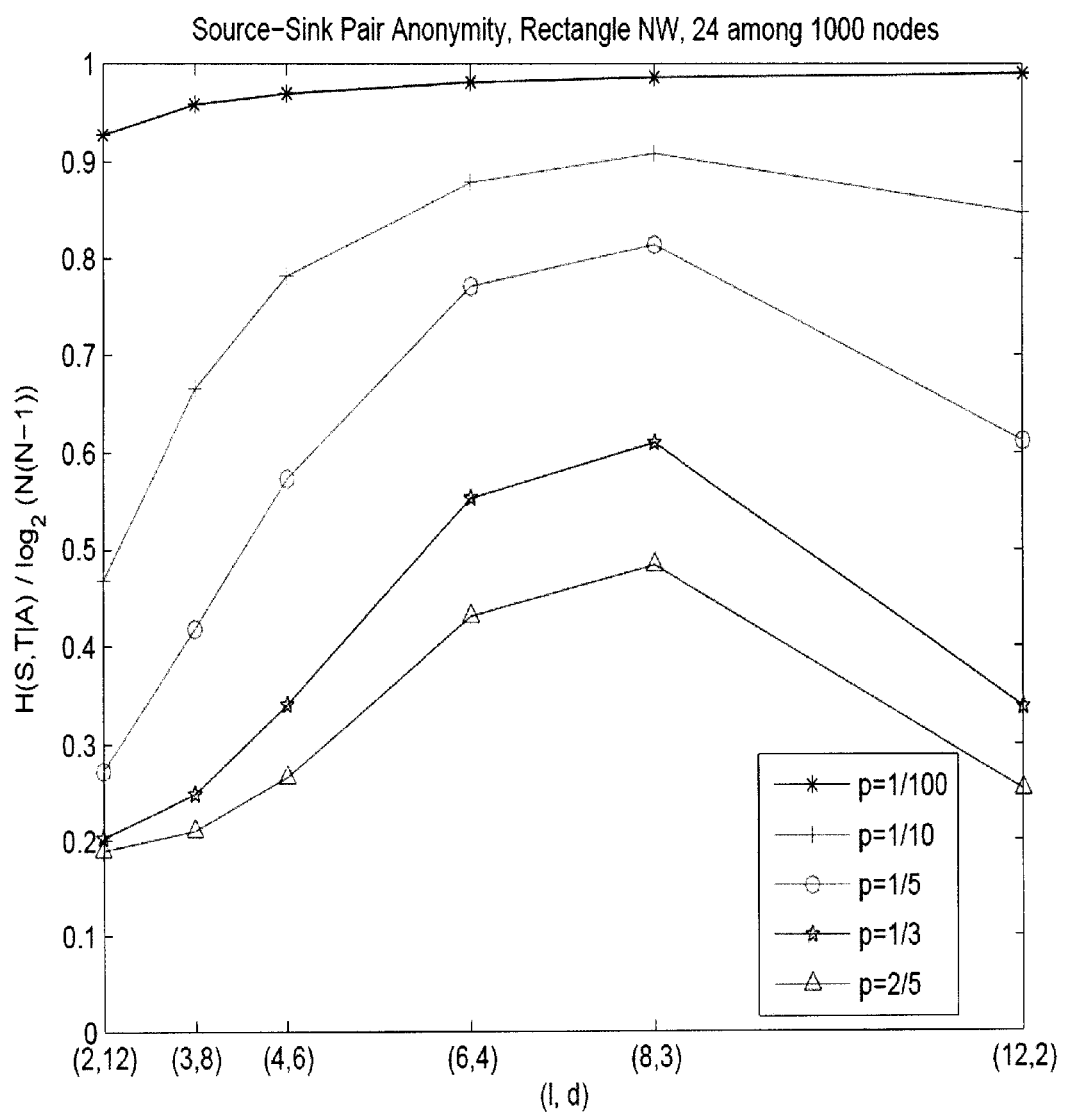
FIG. 2 shows various plots of a source-sink pair entropy, conditioned on adversaries realization as per a given probability, where the sink is randomly located within the subgraph. Each plot is for a different combination of length and width (l, d) of the subgraph and probability p of an adversarial node realization.
Figure 3:
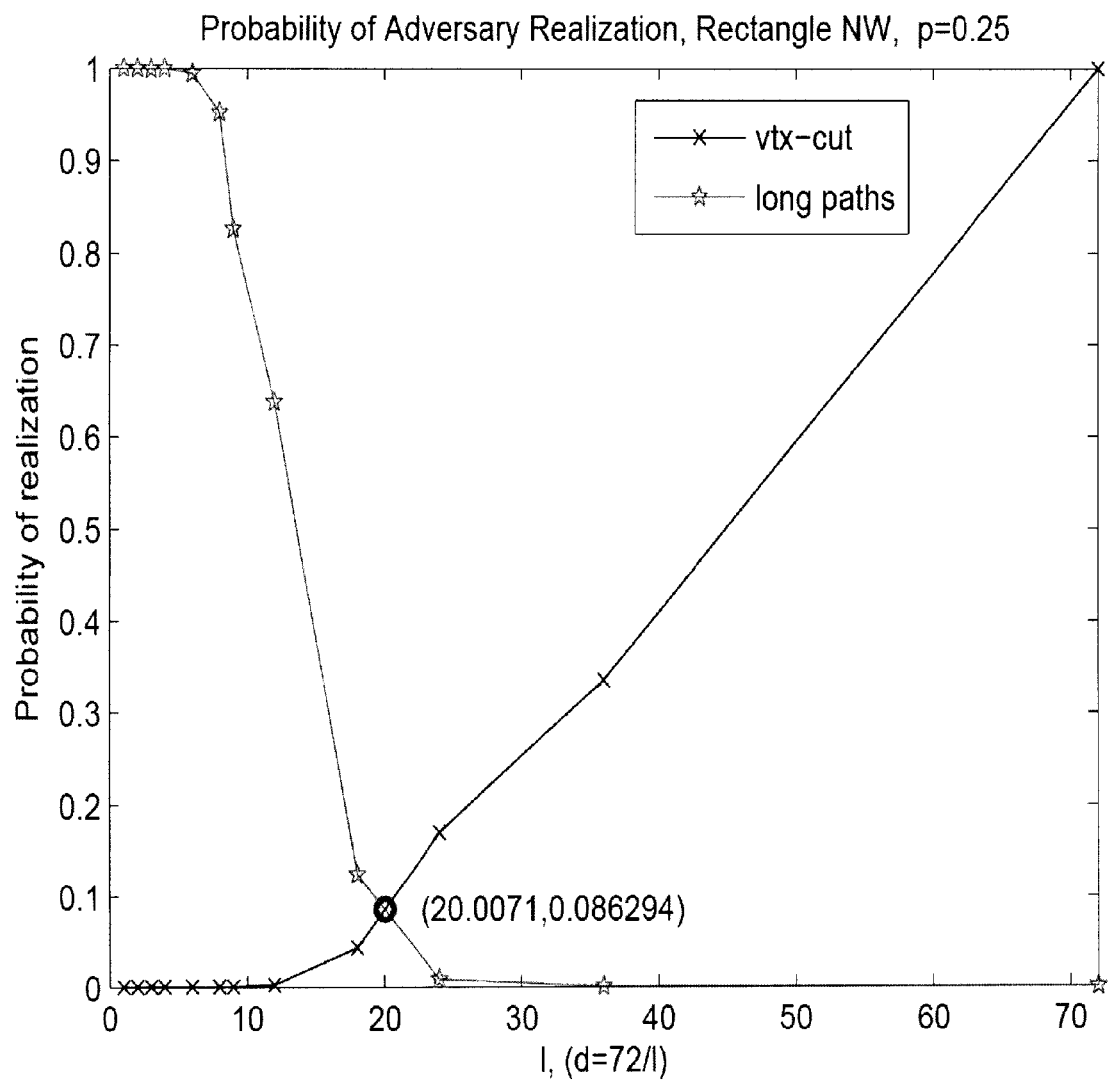
FIG. 3 shows optimal subgraph parameters search for given subgraph size l×d=72 and compromising probability p=0.25. The probability of vertex-cut and the probability of long-path are close near l=20.

Other P2P anonymous networking schemes such as Crowds (e.g. [8] of Annex A1), AP3 (e.g. [9] of Annex A1), and the "slicing the onion" scheme of Katti et al. (e.g. [10] of Annex A1) have less reliance on a PKI, and are useful in situations where a PKI is not available/reliable or may potentially be compromised. Crowds and AP3 use randomized forwarding, and protect the sender but not the receiver identity. The "slicing the onion" scheme considers both sender and receiver anonymity. It splits routing information across multiple relay nodes which are arranged in a rectangular subgraph consisting of l layers of d nodes each, as illustrated in FIG. 1. Information intended for each node (which can include information about its next hop nodes) is split into d slices and multiplied with an invertible d×d matrix. Thus, each node is able to decode its intended information using the packets received from all nodes in the previous layer, while being unable to decode information intended for other nodes. The person skilled in the art readily knows that a hop represents one portion of a path between a source node and a destination node, such as a path between two nodes represented in FIG. 1, and which can be defined via information provided, for example, in packet headers. The type of security provided by the "slicing the onion" scheme is information theoretic in nature, relying on the availability of multiple alternative paths to each node and not on computational assumptions. However, the scheme is not strongly secure in the information theoretic sense (e.g. as measured by mutual information between an adversary's observation and information a sender node is trying to protect) and no formal analytical characterization of the security of the scheme is given. For example, in the "slicing the onion" scheme it is not clear how much information can be observed by an adversary who controls a subset of relay nodes. According to an embodiment of the present disclosure and as later discussed (e.g. as in Section III of the Annex A1), a novel coding scheme, different from the one presented in the "slicing the onion" scheme, over the subgraph is presented which has a formal information theoretic security characterization whose performance can be measured in terms of, for example, mutual information between adversary's observation and information and information to be protected. Further consideration of optimization and randomization of the subgraph parameters for the novel coding scheme are also presented.

Several recent works (e.g. [11]-[13] of Annex A1) have investigated the use of network coding in anonymous networking assuming availability of a separate scheme such as those discussed above, for setting up a subgraph anonymously. These works propose modifications to conventional network coding to protect the coded packets against traffic content correlation which can help identifying participating nodes in a subgraph. In practical network coding, the source information is divided into multiple generations of packets. Network nodes carry out random linear coding among packets of each generation, and the coding operations are captured by global encoding vectors (GEVs) that undergo the same linear coding operations as the data. Such coding is not compatible with the layered encryption schemes employed in non-network coded anonymity schemes to cryptographically transform packet contents at each hop. To address this issue, Fan et al. (e.g. [11] of Annex A1) proposed a scheme in which GEVs are encrypted using homomorphic encryption so that only the sink node with the appropriate decryption key can decode the GEVs and hence the message. While traffic content correlation is made more difficult for the adversary, an adversary who controls multiple participating nodes can still check if a packet is in the span of another set of h packets with $O(h_3+h_n)$ complexity, where n is the length of each packet and $O(\bullet)$ is the Big O notation (or the Order notation). According to a further embodiment of the present disclosure and as described in later sections of the present disclosure (e.g. as well in Section IV of Annex A1) an alternative approach using algebraic coding over layered subgraphs is presented, where the complexity of such content correlation attacks is substantially higher, and therefore traffic content correlation is substantially more difficult for the adversary. Wang et al. (e.g. [13] of Annex A1) proposed a lower overhead network coding scheme where only routing information, flow and generation numbers are encrypted while GEVs and message contents are not encrypted. The scheme proposed by Wang hides the correlation of upstream and downstream GEVs of flows by designing the GEVs to be linearly dependent with those from other flows, but is only secure against external observers and not internal participating nodes, such as, for example, adversarial participating nodes. Gasti et al. (e.g. [12] of Annex A1) considered the problem of checking data integrity in anonymous network coded peer-to-peer file sharing networks in the presence of active adversaries that may corrupt coded packets. Unlike PKI-based integrity checking schemes used in the non-anonymous case, the authors proposed a hash-based approach for integrity checking of packets.

P2P Overlay Model

The P2P overlay network consists of N participating nodes. There is a non-zero probability that a participating node is adversarial). There can be multiple (e.g. one or more) concurrent unicast sessions, each with one source (e.g. sender) and one sink (e.g. recipient). The person skilled in the art readily knows that in such an overlay network, a node can consist of a hardware computer which is configured, via a special program which runs on the hardware computer, to communicate over a network with other participating nodes. Such computer program can comprise all the commands and routines necessary to receive a packet and process the packet according to information which can be stored within the packet and/or within the computer program, and send a processed version of the received packet to one or more next participating nodes, latter nodes which can be identified within the received packet. Each source (e.g. multiple source nodes) can chose a random subset of nodes from the network to construct an overlay subgraph, which it can use to communicate anonymously with an intended sink node (e.g. of a sink layer). By choosing the nodes randomly, potential attacks where the adversary can try to bias the choice towards adversarial nodes by advertising favorable characteristics can be avoided. According to some embodiments of the present disclosure, in cases where information such as the geographic location of nodes can provide an indicator of their probability of being adversarial, such information can be taken into account in the choice of relay nodes and subgraph design. A relaying node can serve in one or more communication sessions (e.g. different subgraphs) simultaneously. It is assumed that the underlying physical network is generally well-connected (e.g. comprises many participating nodes) so that there is path diversity between source and sink nodes. As made evident by the presented work in Annex A1, if all overlay paths between a source-sink pair pass through a very small number of physical nodes, the then anonymity of coding-based schemes can be reduced. As described in [9] of Annex A1, techniques from structured P2P overlay networks (e.g., [14] of Annex A1) can be used to provide an efficient means of choosing a random subset of nodes from a large network, in conjunction with techniques for defending against Sybil attacks either with or without a PKI, as described in [15] of Annex A1.

In the present disclosure, passive attacks from adversarial participating nodes are considered, where the adversarial participating nodes can collude (e.g. work together) to try to determine the source and sink identities from their observed transmissions and connectivity information. Each adversarial node is assumed to follow the communication protocol defined for the subgraph overlay (e.g. run or emulate a same program as all non-adversarial participating nodes on a corresponding hardware computer), and active attacks, such as corruption or dropping of packets by relay nodes (e.g. adversarial), is not considered.

In the present disclosure, conditional entropy is used to measure anonymity, as in [16] and [17] of Annex A1 which makes part of the present disclosure. Such measurement of anonymity is exemplary as the various teachings according to the present disclosure are not bound to a specific function for measuring anonymity. The person skilled in the art can use other measurement functions. Specifically, let A be the adversary's observations (e.g observed messages and local connectivity) corresponding to a realization of adversarial node locations in the subgraph. We consider the conditional entropy (S, T|A) of the source layer nodes S and the sink T given A:

$$H(S,T|A)=\Sigma_a P(a)H(s,T|A=a) \quad (1)$$

where P(a) denotes the probability of a particular adversarial realization A=a.

Subgraph Construction Phase

According to various embodiments of the present disclosure a subgraph construction phase is presented in this section. The subgraph construction phase according to an embodiment of the present disclosure comprises a coding scheme, rather than a PKI, to enable a source node (e.g. a source layer) to anonymously set up a subgraph and send a small secret message (e.g. a cryptographic key, a symmetric key) to each node of the subgraph, including sink nodes at a last layer of the subgraph. The person skilled in the art will appreciate the advantage that sharing a secret key (e.g. as part of the secret message) between a node of the subgraph and the source node can provide, such as provision for sending/receiving between the node of the subgraph and the source node private messages encrypted/decrypted via the secret key at a reduced computational complexity when compared to a method using a public key infrastructure.

An exemplary subgraph according to the present embodiment can be a rectangular layered subgraph consisting of l layers of d nodes each. As further described in Annex A1 which makes part of the present disclosure, such rectangular subgraph is merely an exemplary shape as the teachings according to the various embodiments of the present disclosure can also apply to any (e.g. non-rectangular shaped) layered subgraph. The overlay links between nodes in two consecutive layers can form a complete bipartite graph (e.g. overlay links only allowed from one layer to a next successive layer as depicted in FIG. 1), and the coding scheme can allow each node to decode its next hop routing information only if it receives messages from all of its neighbors in the previous layer. There are no overlay links between nodes that are not in successive layers. To prevent nodes from deducing information about their position in the subgraph from their in-degree or out-degree (e.g. number of links to/from a node), the source can send from d distinct IP addresses. The skilled person readily knows that distinct IP addresses can be provided by using distinct network interface hardware (e.g. network interface card), which can reside in one or more hardware computers.

The novel coding scheme for the overlay subgraph construction according to an embodiment of the present disclosure provides a formal information theoretic security characterization. In particular, as long as the adversary does not control a complete cut between the source and sink (e.g. a complete layer in the exemplary case of the rectangular subgraph depicted in FIG. 1), such that no remaining paths from the source to the link are available, the adversary gains no information about the connections in the subgraph other than the one-hop connectivity information (e.g. identities of immediate neighbor nodes) provided to each node to specify its operation (e.g. via an ID field of a packet to be transmitted by that node). Additionally and according to further embodiments of the present disclosure, optimization and randomization of the subgraph parameters can improve the anonymity of the system and the resource utilization at the same time. As in Tor (e.g. [3] of Annex A1), rendezvous points for hidden services can also be set up by using the proposed novel coding scheme to set up a subgraph from the source to one or more rendezvous nodes. The reverse path setup details can be found in [18, Chapter 3] of Annex A1 which makes part of the present disclosure.

Coding Scheme for Subgraph Construction

According to an embodiment of the present disclosure, a coding scheme for constructing an overlay subgraph is presented:

Let the layers (e.g. each of width d) of the subgraph be indexed in increasing topological order starting from the source layer. Consider nodes $\{u_1, \ldots, u_d\}$, $\{v_1, \ldots, v_d\}$, and $\{w_1, \ldots, w_d\}$ in three successive layers k−1, k, and k+1, respectively. A node $v_j$ (j=1, ..., d) has upstream neighbor nodes $u_i$ (i=1, ..., d) and downstream neighbor nodes $w_i$ (i= 1, ..., d). Let the packet going from node x to y be represented by a vector $g_x^y$ of symbols from a finite field $\mathbb{F}_q$.

The message intended for x consists of, in order, a last-hop flag $\psi_x$, a sink-flag $\phi_x$, an optional secret $\theta_x$ for x (e.g. cryptographic key, a symmetric key), and packets to be forwarded further. The last-hop flag, which can also be considered as a last-layer flag, indicates whether the node is located at the end (e.g. in the last layer) of the subgraph. The sink-flag indicates whether a node is a sink and has a secret $\theta_x$ intended to it; if it is not a sink, $\theta_x$ can consist of a secret key or can consist of random symbols which contain no valid information.

To simplify notation, let $h_x$ denote the private information for node x, that is, $h_x \triangleq (\psi_x, \phi_x, \theta_x)$. The coding scheme ensures that each node $v_j$ can decode its message $(h_{v_j}, g_{v_j}^{w_1}, \ldots, g_{v_j}^{w_d})$ by summing together the contents of all its received packets $(g_{u_1}^{v_j}, \ldots, g_{u_d}^{v_j})$.

The packet contents are defined recursively as follows:

If k is the last layer (k=1), then $\psi_j=1$ and $v_j$ does not have any outgoing packets. Therefore, the message for $v_j$ consists only of the private information for $v_j$. The contents of the packets transmitted from layer k−1 to k are defined as:

$$\begin{cases} g_{u_i}^{v_j} = [v_j K_{u_i}^{v_j}], i = 1, \ldots, d-1 \\ g_{u_d}^{v_j} = \left[v_j, h_{v_j} - \sum_{i=1}^{d-1} K_{u_i}^{v_j}\right] \end{cases}$$

where each $K_{u_i}^{v_j}$, called a random key in the coding scheme according to the present embodiment, is an independent and uniformly distributed random vector of symbols from $\mathbb{F}_q$ of length equal to the message $h_{v_j}$.

If k is not the last layer (k≠1), then $\psi_j=0$ and the packet contents is defined recursively based on the previous layer:

$$\begin{cases} g_{u_i}^{v_j} = [v_j, K_{u_i}^{v_j}], i = 1, \ldots, d-1 \\ g_{u_d}^{v_j} = \left[v_j, (h_{v_j}, g_{v_j}^{w_1}, \ldots, g_{v_j}^{w_d}) - \sum_{i=1}^{d-1} K_{u_i}^{v_j}\right] \end{cases}$$

where each $K_{u_i}^{v_j}$ is an independent and uniformly distributed random vector of symbols from $\mathbb{F}_q$ of length equal to the message $(h_{v_j}, g_{v_j}^{w_1}, \ldots, g_{v_j}^{w_d})$.

FIG. 1 is an example subgraph illustrating this construction.

According to an embodiment of the present disclosure, each node $v_j$ in the network (e.g. subgraph) strips off its ID (e.g. as entered in an identifier field of a transmitted packet and uniquely identifying the node to which the transmitted packet is addressed to) from each received packet $g_{u_1}^{v_j}$ and sums over the packets' contents to decode its message:

$$\sum_{i=1}^{d-1} K_{u_i}^{v_j} + (h_{v_j}, g_{v_j}^{w_1}, \ldots, g_{v_j}^{w_1}) - \sum_{i=1}^{d-1} K_{u_i}^{v_j} = (h_{v_j}, g_{v_j}^{w_1}, \ldots, g_{v_j}^{w_d})$$

Note that the size of the packet contents decreases with distance from the source. It follows that according to a further embodiment of the present disclosure, to prevent adversaries from deducing their location within the subgraph based on packet size, a constant packet size is maintained by padding with random symbols. The details of the padding algorithm are omitted due to limited space and can be found in [18, Chapter 3, Section 3.3.1] of Annex A1 which makes part of the present disclosure.

Figure 9A:
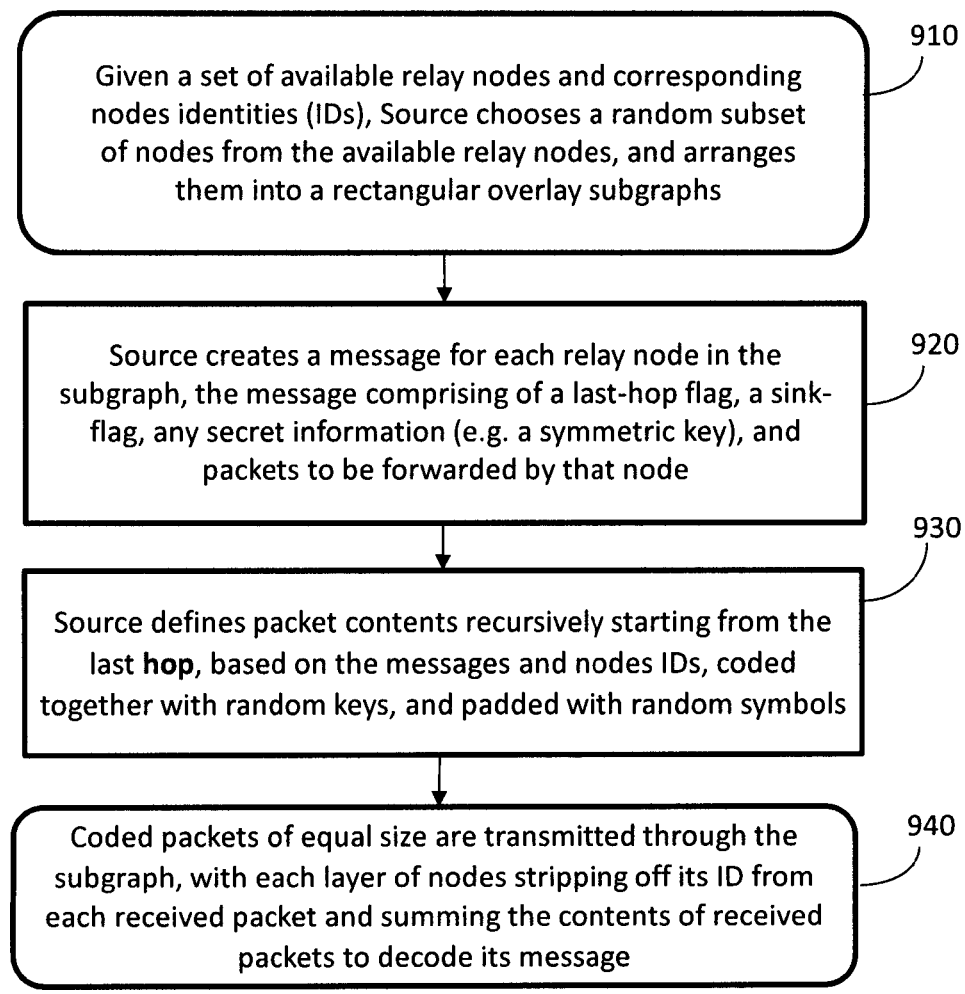
FIG. 9A shows a flowchart according to an embodiment of the present disclosure of a construction phase of an overlay subgraph for anonymous communication using packets defined in FIG. 1.
Figure 9B:
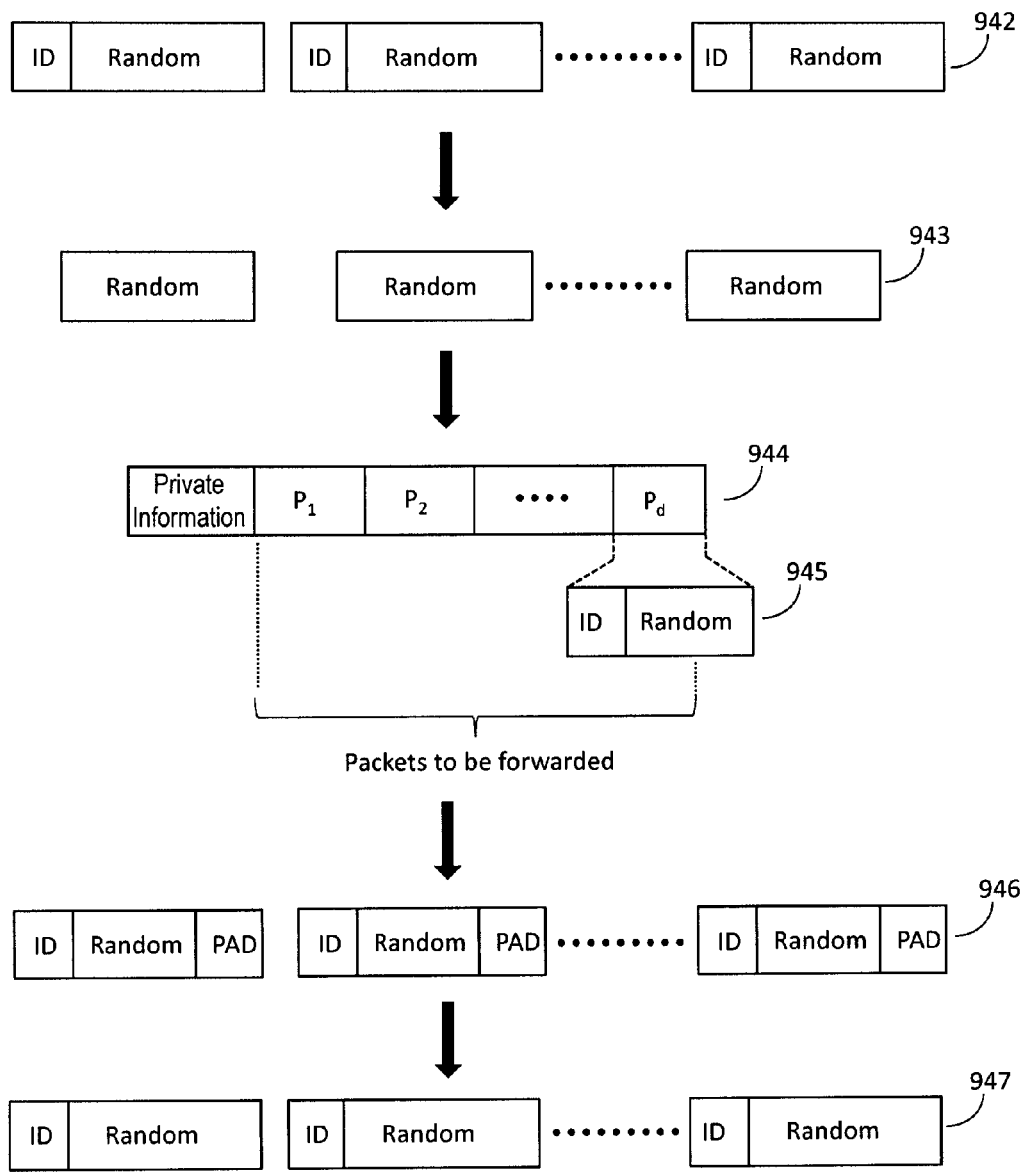
FIG. 9B shows structures and construction of packets of a node of the subgraph represented by FIG. 1 and FIG. 9A.

According to a further embodiment of the present disclosure, a subgraph construction algorithm based on the provided coding scheme is presented below, and an associated flowchart (900) depicted in FIG. 9A and packet structures as depicted in FIG. 9B:

i. Given a set of available relay nodes and corresponding nodes identities (IDs):

ii. [Step 910] Source chooses a random subset of nodes from the available relay nodes, arranges them into a rectangular overlay subgraph;
iii. [Step 920] Source creates a message for each relay node in the subgraph, the message comprising a last-hop flag (e.g. last-layer), a sink-flag, any secret information (e.g. a symmetric key, a cryptographic key), and packets to be forwarded by the relay node;
iv. [Step 930] Source defines packet contents recursively starting from the last hop (e.g. a node in the last layer), based on the messages and nodes IDs, coded together with random keys, and padded with random symbols (942);
v. [Step 940] Coded packets of equal size (942) are transmitted through the subgraph via the source and relay nodes (to one or more sink nodes of a last layer of the subgraph), with each relay/sink node of each layer of the subgraph stripping off its ID (943) from each received packet and summing the contents of received packets to decode its message (944).

As depicted in FIG. 9B and according to the described embodiment of the present disclosure, the decoded message for each node, represented by block (944) of FIG. 9B, contains the private information $h_x$ for the node as well as packets ($P_1, P_2, \ldots P_d$) to be forwarded to the next layer by the node. Each of the packets to be forwarded (945) in turn can contain an ID (e.g. identifying a next node of the next layer) and a random coded message intended to the node identified by the ID. The packet to be forwarded is padded with random symbols (946) to obtain a set of packets for the next nodes (947) which look similar to the packet received (942) by the node, in both structure and size. As previously mentioned, detailed information on the padding with random symbols can be found in [18, Chapter 3, Section 3.3.1] of Annex A1 which makes part of the present disclosure. It should be noted that although the various packet structures and associated construction steps depicted in FIG. 9B show the ID field included in the packets to be forwarded (945), according to further embodiments of the present disclosure, such ID field can be part of the private information $h_x$ intended for the node.

Theorem 1 of Annex A1, which makes part of the present disclosure, characterizes the information theoretic security properties of the signaling scheme against adversarial overlay nodes and overlay links, such as paths between overlay nodes that contain an adversarial physical node. Accordingly, if there is a non-adversarial path (or equivalently, no adversarial cut) between the source and the last layer, the signaling (e.g. amongst the various nodes) is information theoretically secure in that colluding adversarial nodes obtain no information about the subgraph other than their one-hop neighbors. Further information about the information theoretic security properties of the proposed subgraph structure can be found in Annex A1, sections III-A, III-B and III-C.

Randomized Subgraph Construction

Figure 4:
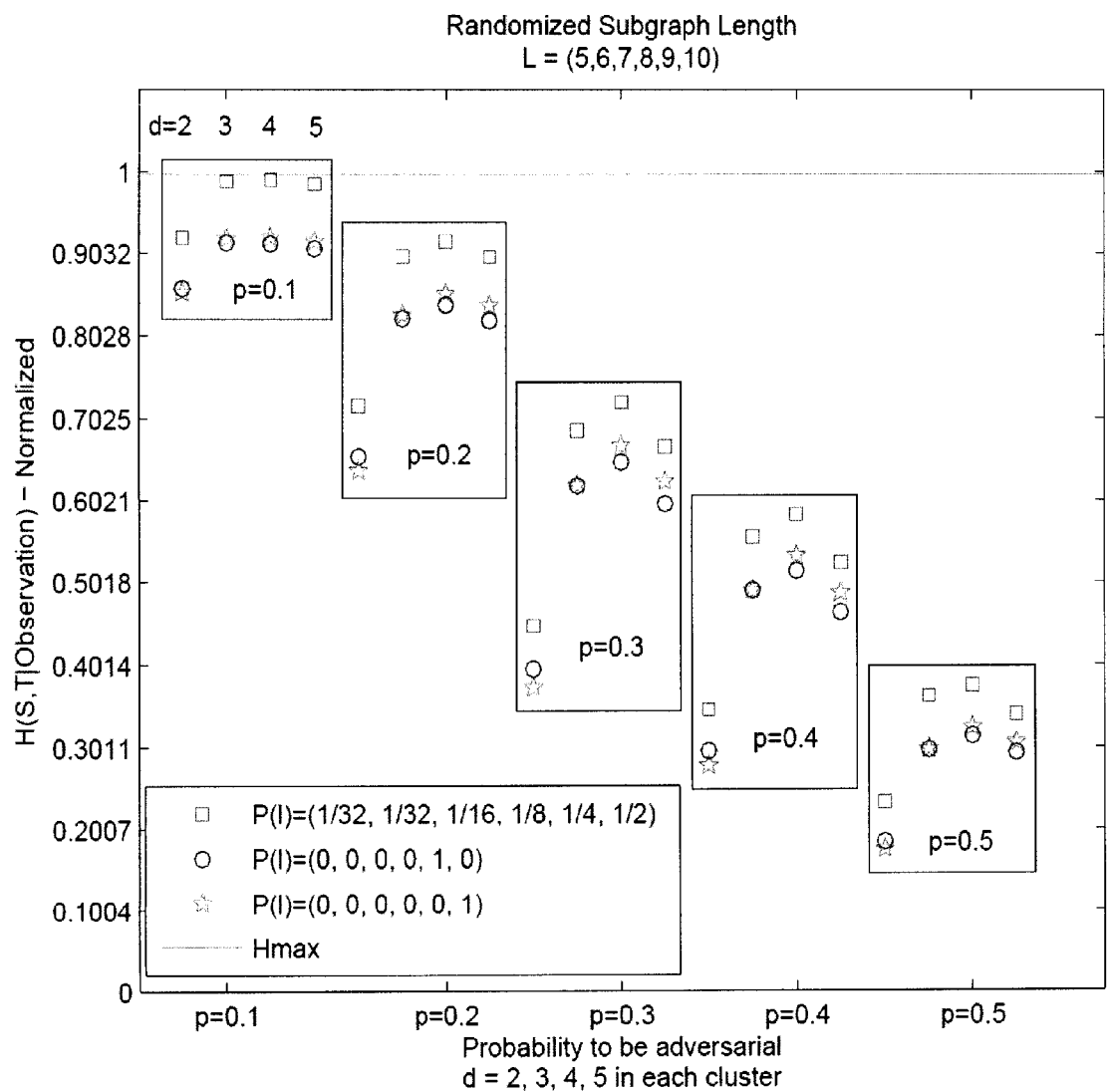
FIG. 4 shows performance of a randomized subgraph according to an embodiment of the present disclosure: a source randomly chooses a subgraph length from a probability distribution, L, and constructs a subgraph.

According to a further embodiment of the present disclosure a randomized strategy where the constructed subgraph has length drawn randomly from a suitable distribution is presented. Note that randomizing width is not helpful since all nodes know the width from in-degree and out-degree of flows (e.g. number of links to/from a node). Section III-D of Annex A1, which makes part of the present disclosure, provides details in the analysis of the entropy metric for the case of randomized strategy for length determination, and shows by simulations, that randomized length simultaneously can provide better anonymity (e.g. higher entropies) as well as more efficient resource usage (e.g. shorter expected length of subgraph and smaller expected subgraph size) than for the deterministic case where the length l is fixed. Some results of this analysis are shown in FIG. 4, where the entropy calculation is performed by considering various cases for the relative positions of the sink and adversarial nodes, as further described in [18, Chapter 13] of Annex A1 which makes part of the present disclosure.

Evaluation of the performance of the randomized scheme is done by simulation experiments, as described in [18, Chapter 13] of Annex A1 which makes part of the present disclosure, in which the total number of nodes in the network N, adversarial probability p, and subgraph length set L are given, while the distribution of lengths P(l), l∈L and the subgraph width d are varied. In each simulation, N=10000, p is fixed among {0.1, 0.2, 0.3, 0.4, 0.5}, and d is fixed among {2, 3, 4, 5}. The source first chooses a subgraph length from L={5, 6, 7, 8, 9, 10} with respect to some given probability distribution P(l), and then constructs a subgraph. FIG. 4 represents a plot of normalized entropies conditioned on adversaries realization. Each rectangle represents a group of a same adversarial probability p, within which subgraph widths vary taking one value from the set of {2, 3, 4, 5}. The star and circle markers represent deterministic cases with fixed subgraph length l=10 and l=9, respectively. The square marker represents a random case with probability distribution P(l)={1/32, 1/32, 1/16, 1/8, 1/4, 1/2} for l={5, 6, 7, 8, 9, 10}, respectively. As depicted in FIG. 4, the randomized scheme has smaller expected length (9.031) as well as better anonymity than the best deterministic choice l=10.

An optimal probability distribution of L that maximizes the source-sink pair anonymity can be derived from the simulation results (e.g. [18], Chapter 3 of Annex A1). According to the simulation results the performance of the source-sink pair anonymity can depend on the probability distribution of L. For example, probability distribution P(l)={1/32, 1/32, 1/16, 1/8, 1/4, 1/2} in FIG. 4 outperforms all deterministic cases (l=9, 10). The rule of thumb for a good probability distribution is that it should concentrate more on the longer subgraph length and the longer length should have larger probability than the shorter length (i.e., the probability monotonically increases with the length). The expected length should not be too smaller than the longest subgraph length. Once the criterion is satisfied, the difference in performances of different probability distributions is negligible (less than 1%) whereas the percentage difference between the randomized case and the deterministic case is over 10%.

Data Transfer Phase

In this section, availability of a subgraph setup scheme (either PKI-based as in [2], [3] of Annex A1, or coding-based as in the previous section) that can be used to distribute coding/forwarding instructions to each node of the subgraph is assumed. According to an embodiment of the present disclosure, a network coding scheme is provided which can be used in the data transfer phase of a subgraph (e.g. initialized using the subgraph setup scheme), where the coding scheme provides end-to-end encryption for data confidentiality. Such network coding scheme comprises column operations to address content correlation attacks. Performance of the proposed network coding, as well as a corresponding subgraph shape and connectivity, with respect to anonymity and congestion (e.g. when the amount of anonymous traffic that can be carried by overlay links and nodes is limited) is further discussed and presented in Annex A1 which makes part of the present disclosure. Limits in the amount of anonymous traffic may be due to the use of traffic shaping to prevent traffic analysis, for instance, by carrying anonymous traffic in the payload of packets that mimic allowed traffic types. As in the prior sections, there are N participating nodes, an unknown subset of which may be adversarial. The adversarial nodes collude to try to determine the identities of sources and sinks from their collective observations; only passive attacks are considered. Each source can construct a subgraph for anonymous communication to a sink node using a randomly chosen subset of available nodes.

Coding Scheme for Data Transfer

Each unicast session transmits information over a rectangular subgraph. Two types of rectangular subgraphs parameterized by length l, width d and connectivity are considered: random subgraph and parallel path subgraph. Network coding is carried out over the random subgraph as described below. The parallel path subgraph, which is used as comparison, employs conventional cryptographic transformations, well known to the person skilled in the art, at each hop. This prevents non-connected adversarial nodes from deducing that they are in the same subgraph and effectively prevents them from colluding.

In the random subgraph, between two consecutive layers, each pair of nodes is connected with probability r, subject to the following constraints:
  i. Each node's in-degree should be at least two, such as $\{2, \ldots, d\}$, so that nontrivial network coding occurs;
  ii. Each node's out-degree should be at least one, such as $\{1, \ldots, d\}$, to avoid a dead-end.

To make the nodes neighboring the source have in-degree at least 2, the source layer contains at least 2 nodes. As previously mentioned, a source can use multiple IP addresses connected by secure channels.

It should be noted that for a random subgraph employing straightforward network coding (e.g. linear network coding), adversaries that are not connected may still be able to collude since the subspaces spanned by a sufficiently large collection of packets from disconnected sets of adversaries have a larger intersection if they are in the same session as compared to the case where they are in different sessions. Therefore, by correlating the subspaces of observed packets, adversaries may be able to infer that they are likely to be in the same session even if they are not connected. It follows that according to an embodiment of the present disclosure a novel low-complexity technique to address this vulnerability is provided (e.g. described below).

Figure 5:
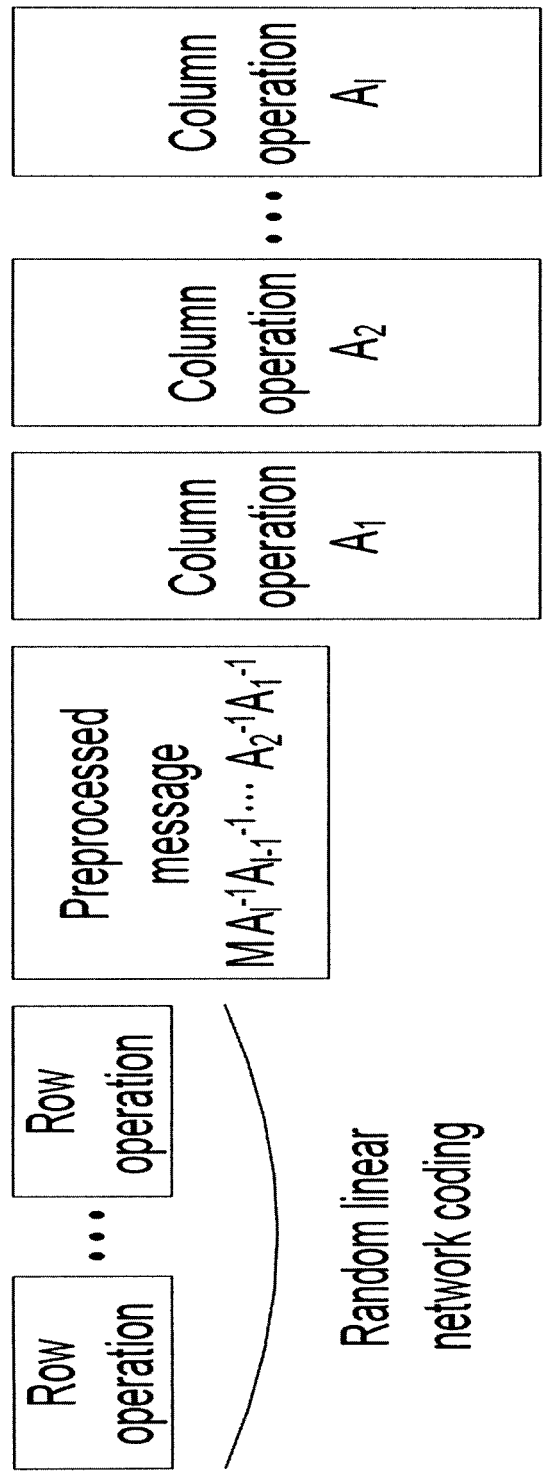
FIG. 5 shows coding scheme according to an embodiment of the present disclosure. In addition to the random linear network coding (row operation), each node performs column operation to the received packets that are preprocessed by the source in a systematic way.
Figure 6:
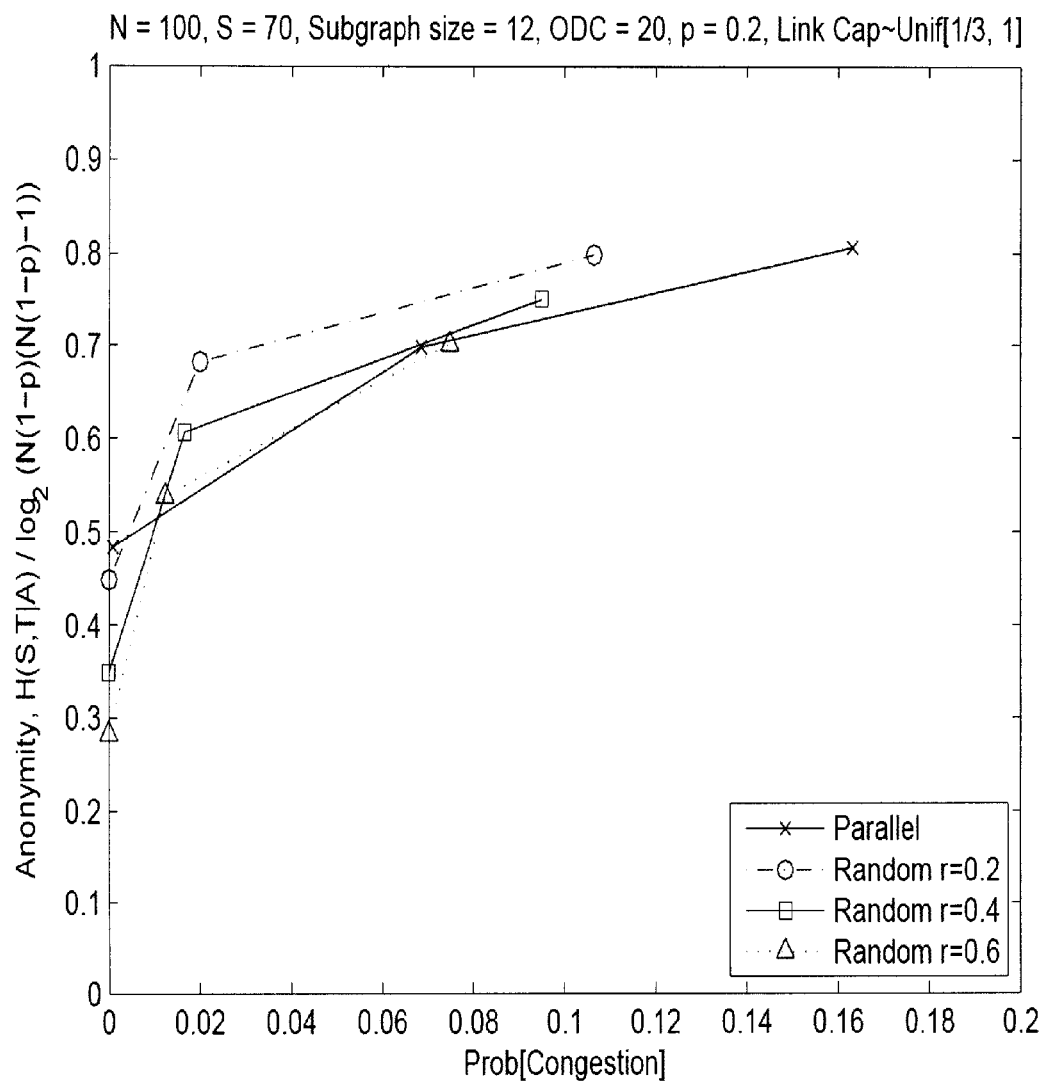
FIG. 6 shows performance comparison for different subgraph shape and connectivity, comprising parallel path and randomized, as measured by anonymity and congestion. (l, d, r)=(3, 4, 0.2) provides reasonably good anonymity and congestion at the same time.
Figure 7:
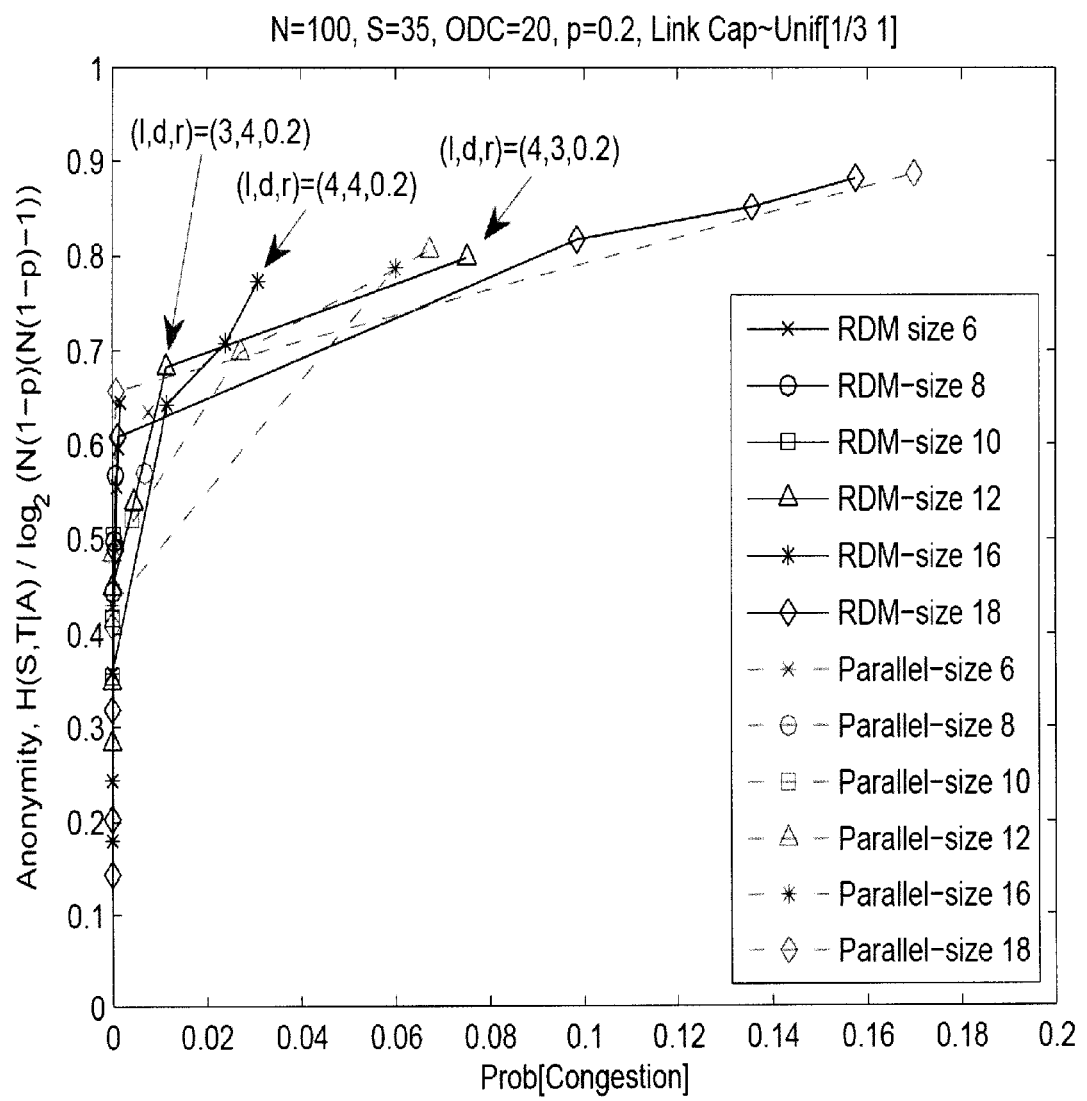
FIG. 7 shows various plots of the "envelopes" from each subgraph size which can be used to find the best subgraph shape and connectivity. As per the plots presented in FIG. 7, a higher performing subgraph can be one of (l, d, r)=(3, 4, 0.2), (l, d, r)=(4, 4, 0.2), or (l, d, r)=(4, 3, 0.2) depending on the relative importance between anonymity and congestion.

In the (linear) network coding system, relaying nodes linearly combine the received packets with coefficients randomly chosen from a sufficiently large field. These linear combinations are row operations on the matrix whose rows correspond to the received packets (e.g. [19]-[21] of Annex A1), and are specified by a left multiplication matrix. In the proposed scheme, before (or after) the row operations, each relay node in layer i performs a column operation by right-multiplying with a matrix $A_i$. The matrix $A_i$ for the $i^{th}$ layer is specified by instructions from the source in the subgraph setup phase, and the matrices for different layers are distinct. The source node generates invertible matrices $A_i$ with (i=1, . . . , l), independently at random, where the elements of a matrix are drawn from some distribution. In a practical implementation, instead of sending the whole matrix, the source can send pseudorandom seeds to reduce overhead. Each pseudorandom seed must produce an invertible random matrix (e.g. pseudorandom seed generates, via some established mathematical operations, a random sequence of numbers which can be used as values of the invertible matrix). Using the pseudorandom seed, each node can generate corresponding matrix for the column operation. To transmit message M, the source preprocesses the message by right-multiplying the message with $A_l^{-1} A_{l-1}^{-1} \ldots A_2^{-1} A_1^{-1}$ as depicted by FIG. 5. It should be noted that the message in the first layer (next to the source) $M A_l^{-1} A_{l-1}^{-1} \ldots A_2^{-1}$, and the message in the last layer (next to the sink) M, have different subspaces, so it is difficult for adversaries to infer that they correspond to the same information.

Figure 10:
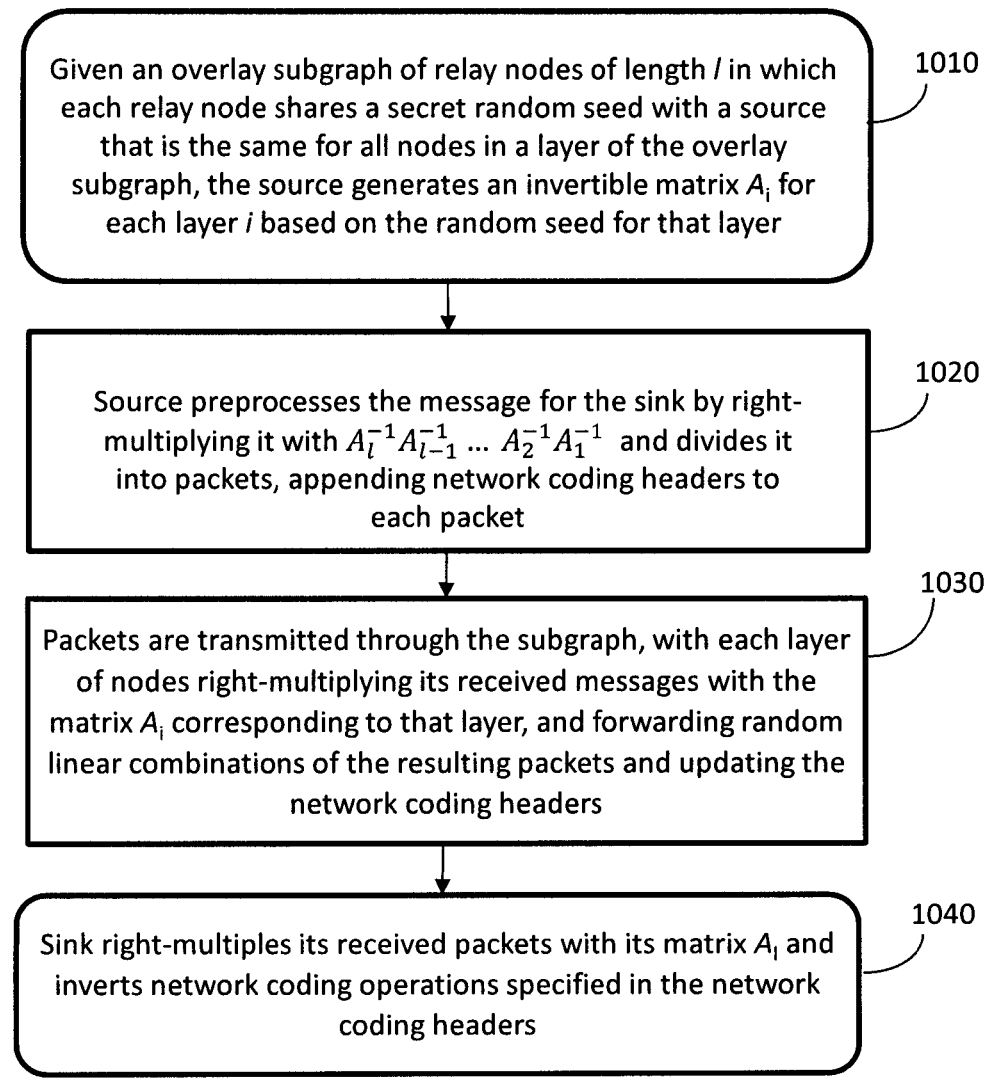
FIG. 10 shows a flowchart according to an embodiment of the present disclosure of a coding scheme for anonymous data transmission over an overlay subgraph.

According to an embodiment of the present disclosure, a data transfer coding scheme for use in a an overlay subgraph is presented below, and an associated flowchart (1000) depicted in FIG. 10:
  i. Given: an overlay subgraph of relay nodes of length l in which each relay node shares a secret pseudorandom seed with the source that is the same for all nodes in a layer of the overlay subgraph;
  ii. [Step 1010] Source generates an invertible matrix $A_i$ for each layer i based on the pseudorandom seed for that layer;
  iii. [Step 1020] Source preprocesses the message M for a sink (e.g. all nodes of a sink layer) by right-multiplying it with and divides it into packets, appending network coding headers to each packet, wherein the network coding headers are in correspondence of linear coding (e.g. using random coefficients) performed to the each packet;
  iv. [Step 1030] Packets are transmitted through the subgraph, with each layer of nodes right-multiplying its received messages with the matrix $A_i$ corresponding to that layer, and forwarding random linear combinations of the resulting packets and updating the network coding headers;
  v. [Step 1040] Sink right-multiples its received packets with its matrix $A_l$ and inverts network coding operations specified in the network coding headers.

The novel scheme presented in the prior paragraph can prevent non-connected adversaries from deducing whether they are in a same subgraph; suppose that a trusted node v in layer k is connected to adversaries $u_1, u_2$, and w. The trusted node v receives packets $M_1$ and $M_2$ from $u_1$ and $u_2$, respectively, and sends $M_v = c_1 M_1 A_k + c_2 M_2 A_k$ to w, where $c_1$ and $c_2$ are random coefficients from a sufficiently large field, and $A_k$ is the column operation matrix for nodes in layer k. Without knowledge of $A_k$, the packets observed by $u_1, u_2$, and w appear unrelated. Adversaries can try all column operation matrices they possess, but if the probability p of a node being adversarial is reasonably small and the network contains a large number of nodes and sessions, this attack entails high overhead on the adversary's part and has low probability of success. Therefore, it is reasonable to assume that the adversary does not employ such an attack. Note that larger in-degree also increases the number of nodes that the adversary needs to control in order to be able to correlate packet contents.

Information about performance metrics as related to anonymity and congestion of the presented coding scheme for the data transfer phase can be found in Annex A1 which makes part of the present disclosure, with further details in [18, Chapter 3] of Annex A1.

Hardware Consideration

Figure 8A:
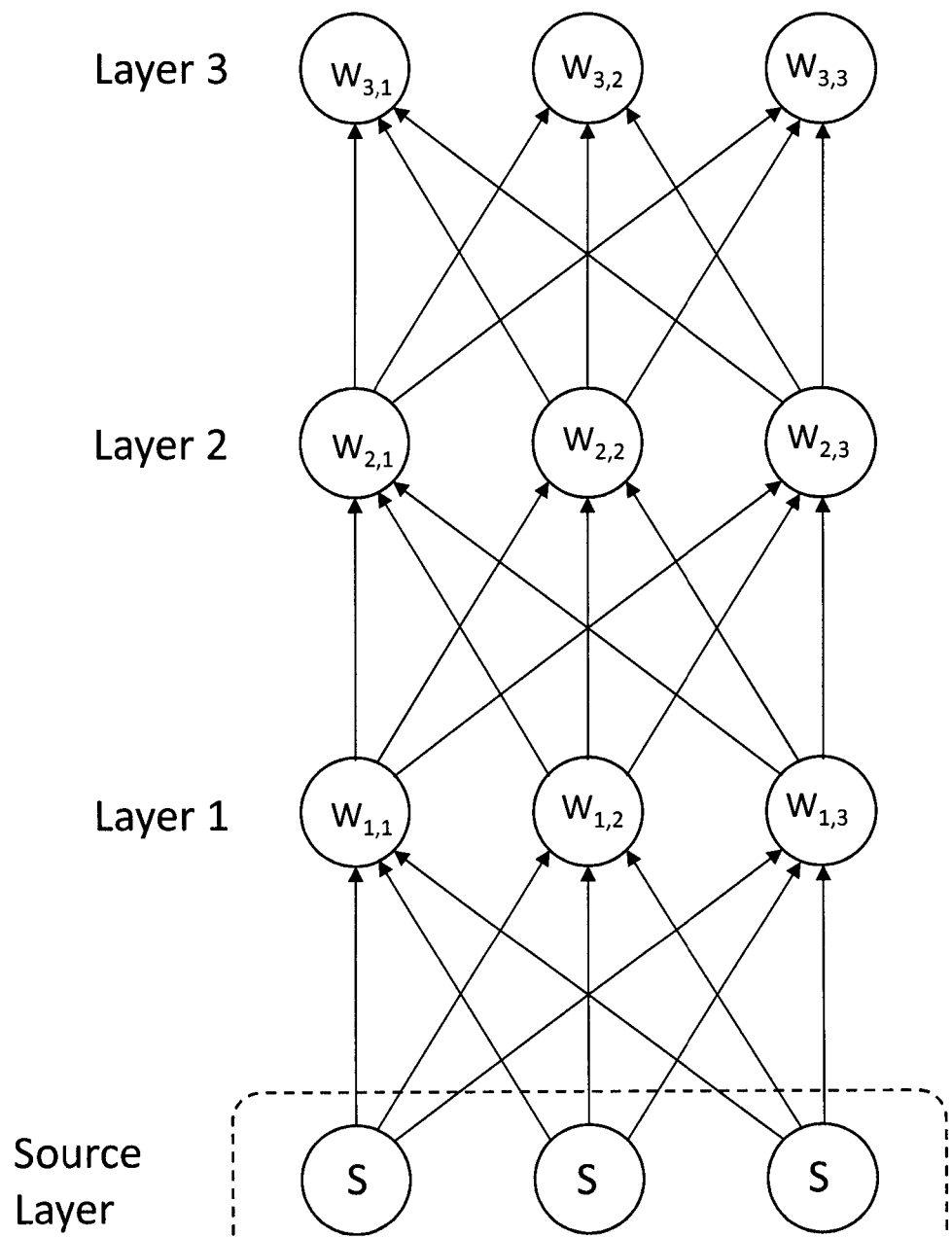
FIGS. 8A-B show a rectangular and a non-rectangular overlay subgraph respectively, comprising a plurality of computer-based nodes.

With reference back to the overlay subgraph presented in FIG. 1 of the present disclosure and described in the previous sections, FIG. 8A shows a similar rectangular subgraph (800a) of length 3 and width 3. The length of the subgraph is represented by the number of different layers of the subgraph (800a), namely layers 1-3. The length and width of the subgraphs considered in the various embodiments according to the present disclosure can be different, with a width and a length preferably being larger than or equal to 2, such as 2, 3, 4, . . . , 10, 100. As previously mentioned, the various teachings according to the present disclosure equally apply to subgraphs of shapes different than a rectangular shape. A subgraph (800b) with a non-rectangular shape is presented in FIG. 8B. The subgraph (800b) comprises layers (e.g. layer 2) which do not have a same number of nodes. In the exemplary non-rectangular subgraph (800b), all layers except layer 2 have 3 nodes ($w_{i,1}$, $w_{i,2}$, $w_{i,3}$), whereas layer 2 has 4 nodes ($w_{2,1}$, $w_{2,2}$, $w_{2,3}$, $w_{2,4}$). The various network links connecting the various nodes of the subgraphs (800a, 800b) are represented by lines with arrows representing the typical data flow within the subgraph. Such links can be wired connections using conductors, such as twisted lines, coax cables, Ethernet cables, any type of cable using a conductor to carry electrical/optical signals, etc. . . . and/or wireless links using RF signals transmitted in the air. Some links can be made using a combination of wired and wireless links.

Figure 8B:
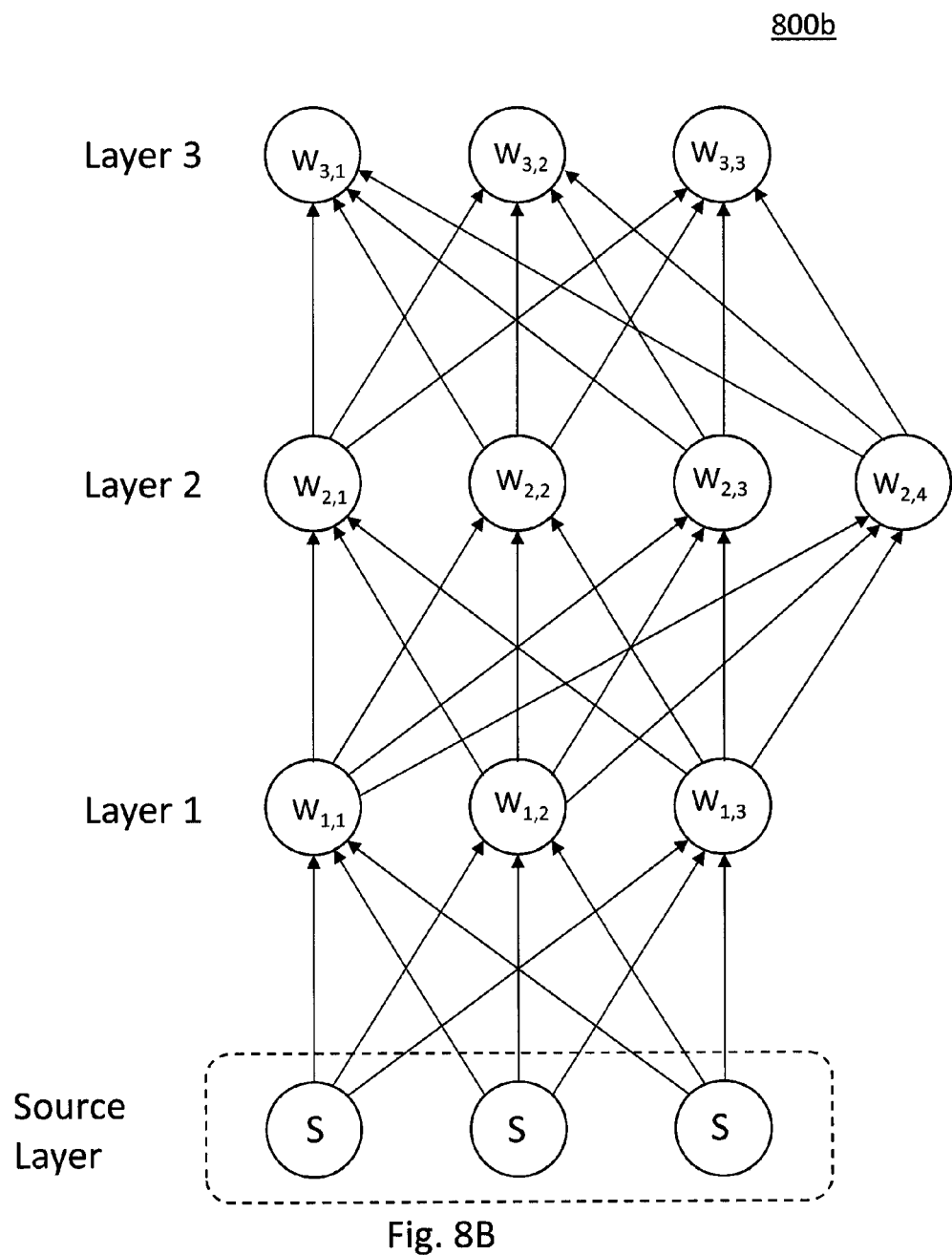

The person skilled in the art is well aware that in anonymous P2P communication it is important to be able to choose relay nodes amongst a large pool of available nodes. Such pool of available nodes are interconnected, via communication links similar to ones described in the previous paragraph, without the use of a centralized server. An overlay subgraph, such as one depicted in FIGS. 1, 8A-8B is merely a software architecture applied upon a subset of the available relay nodes and as defined by a source node. Such architecture can be provided by a combination of a communication software running on the participating nodes and configuration commands provided (e.g. by the source) to the participating nodes (and interpreted via the communication software), defining sequence of steps and related communication protocols for each node of the subgraph, as, for example, defined via the various embodiments of the present disclosure. In a practical configuration, the available nodes can be personal computers (PCs), personal digital assistants (PDAs), cell phones, or various other network appliances, such as routers, switches and hubs, globally connected to the internet and running a communication software which can enable these computers to communicate with each other as to create overlay subgraphs used for anonymous communication. Nodes can have unique identifiers such as a media access control (MAC) address which enables their identification over the network. Such overlay subgraph can use the physical resources available on the various participating nodes, such as processing power, disk storage and/or network bandwidth, to efficiently transfer data from a source to a sink (e.g. destination) without the use of a centralized processor (e.g. server). The various teachings according to the present disclosure further allow anonymity during a data transfer phase (e.g. a session), such as minimum information about the participating nodes is provided, as well as protection of the message in the data transfer, such as only the sink node can see the message (e.g. a decoded version of the message).

As mentioned in the previous paragraph, each of the participating nodes (e.g. source, sink, relay) of the subgraph of FIGS. 1, 8A-8B can be a computer processor running the special communication software, latter software can encompass various steps according to the various encoding schemes of the present disclosure. Such computer processor may be implemented using any target hardware (e.g. FIG. 11, described later) with reasonable computing power and memory size, either off the shelf, such as a mainframe, a microcomputer, a desktop (PC, MAC, etc.), a laptop, a notebook, etc. . . . or a proprietary hardware designed for the specific task and which may include a microprocessor, a digital signal processor (DSP), various FPGA/CPLD, etc. The person skilled in the art readily knows that various participating nodes can use various different computer processors, with different operating systems (OS) and hardware configurations. As such, the special communication software can be adapted to any specific target hardware of a participating node.

The methods (e.g. code/subgraph construction and associated flow charts) and communication systems (e.g. P2P anonymous network systems) described in the present disclosure may be implemented in hardware, software, firmware or combination thereof. Features described as modules, nodes or components may be implemented together or separately using a combination of hardware, software and/or firmware. A software portion of the methods (e.g. flowcharts) of the present disclosure may comprise a computer-readable medium which comprises instructions (e.g. executable program) that, when executed, perform, at least in part, the described methods, such as construction in part or in entirety of a subgraph according to the various embodiments of the present disclosure and/or initiating transferring/relaying data/messages/packets to other hardware/software/firmware based systems. The computer-readable medium may comprise, for example, a random access memory (RAM) and/or a read-only memory (ROM). The instructions may be executed by a processor (e.g., a digital signal processor (DSP), an application specific integrated circuit (ASIC), a field programmable logic array (FPGA) or a combination thereof which can be integrated within a single integrated circuit (IC).

Figure 11:
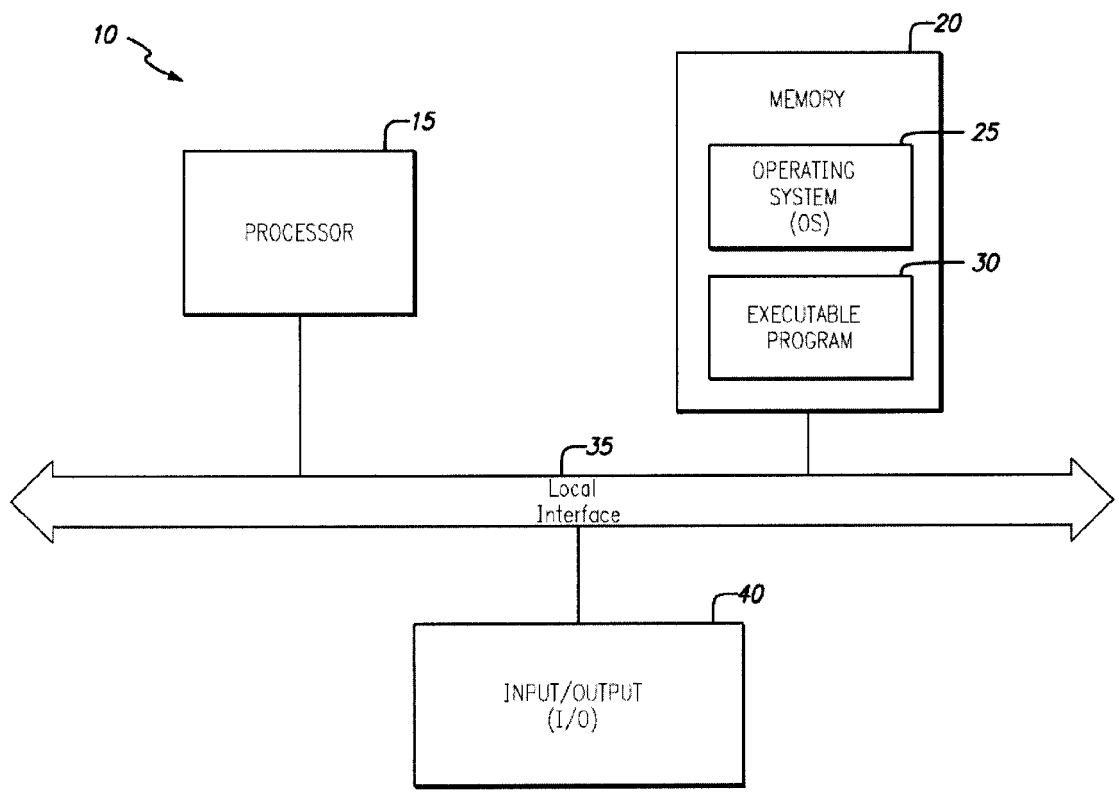
FIG. 11 shows an exemplary target hardware used for various communicating nodes of the various subgraphs of the present disclosure.

FIG. 11 is an exemplary embodiment of a target hardware (10) (e.g. a computer system) for implementing one or more code/subgraph construction methods (e.g. a source node) and/or decoding of such encoded data (e.g. a relay/sink nodes) according to the various teachings of the present disclosure. This target hardware comprises a processor (15), a memory bank (20), a local interface bus (35) and one or more Input/Output devices (40). The processor may execute one or more instructions related to the implementation of the various provided coding construction methods (e.g. in entirety or partially) and as provided by the Operating System (25) based on some executable program stored in the memory (20). These instructions are carried to the processors (20) via the local interface (35) and as dictated by some data interface protocol specific to the local interface and the processor (15). It should be noted that the local interface (35) is a symbolic representation of several elements such as controllers, buffers (caches), drivers, repeaters and receivers that are generally directed at providing address, control, and/or data connections between multiple elements of a processor based system. In some embodiments the processor (15) may be fitted with some local memory (cache) where it can store some of the instructions to be performed for some added execution speed. Execution of the instructions by the processor may require usage of some input/output device (40), such as inputting bitstream data comprising messages to be encoded and/or decoded, inputting commands from a keyboard, outputting data to a display, or outputting encoded data packets (e.g. per provided methods) to be transmitted over a communication channel or inputting data packets from the communication channel. In some embodiments, the operating system (25) facilitates these tasks by being the central element to gathering the various data and instructions required for the execution of the program and provide these to the microprocessor. In some embodiments the operating system may not exist, and all the tasks are under direct control of the processor (15), although the basic architecture of the target hardware device (10) will remain the same as depicted in FIG. 11. In some embodiments a plurality of processors may be used in a parallel configuration for added execution speed. In such a case, the executable program may be specifically tailored to a parallel execution. Also, in some embodiments the processor

(15) may execute part of a method as provided in the present disclosure, and some other part may be implemented using dedicated hardware/firmware placed at an Input/Output location accessible by the target hardware (10) via local interface (35). The target hardware (10) may include a plurality of executable program (30) (e.g. including a special communication program), wherein each may run independently or in combination with one another. These executable programs can comprise instructions, that when executed by the processor, perform at least part of a method (e.g. construction algorithm, encoding, decoding) presented in the present disclosure.

Such exemplary computer hardware as depicted by FIG. 11 can be implemented in an integrated chip (IC). According to some embodiments of the present disclosure, a code construction module implementing the various embodiments of the present disclosure, whether entirely (e.g. encode and decode) or partially (e.g. encode or decode) can be implemented partially or in its entirety within an IC. Such IC can be used as part of a system to encode/decode data messages according to the various embodiments of the present disclosure. A program stored in a memory (e.g. programmable memory) of the IC can be upgraded such as to fit an encoding and/or decoding function of the present disclosure according to a specific channel erasure link and/or other coding parameters, such as the message size, message priority, message creation interval, packet size and decoding delay, whether independently or in combination. The skilled person can think of various other possible hardware/software/firmware implementations of the systems presented in FIG. 1 and FIGS. 8A-8B, whether partially or entirely, and using the provided code constructions whose flowcharts are depicted in FIGS. 9A and 10.

The examples set forth above and in Annex A1 which makes part of the present disclosure, are provided to give those of ordinary skill in the art a complete disclosure and description of how to make and use the embodiments of the anonymous overlay subgraph creation and related creation and data transfer coding, and are not intended to limit the scope of what the inventors regard as their disclosure. Modifications of the above-described modes for carrying out the disclosure may be used by persons of skill in the information/coding/communication theory and processing, and are intended to be within the scope of the following claims. All patents and publications mentioned in the specification may be indicative of the levels of skill of those skilled in the art to which the disclosure pertains. All references cited in this disclosure and Annex A1 which makes part of the present disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

A number of embodiments of the disclosure have been described. Nevertheless, it will be understood that various modifications may be made without departing from the spirit and scope of the present disclosure. Accordingly, other embodiments are within the scope of the following claims.

The invention claimed is:

1. A computer-based method for constructing an overlay subgraph, the computer-based method comprising:
    providing a set of available computer-based relay nodes communicating over a plurality of transmit and/or receive links;
    selecting, via a computer-based source, a random subset of the available computer-based relay nodes;
    based on the selecting, arranging, via the computer-based source, the selected computer-based relay nodes into an overlay subgraph, comprising a plurality of layers of width larger than or equal to two;
    based on the selecting and the arranging, creating, via the computer-based source, a message for each computer-based relay node, wherein the message comprises information particular to the each computer-based relay node;
    based on the creating, generating, via the computer-based source, a first layer coded packets;
    based on the generating, transmitting, through the subgraph, coded packets of a same size to the plurality of layers of the overlay subgraph;
    based on the transmitting, decoding the message for each computer-based relay node of the overlay subgraph via the each computer-based relay node;
    wherein a mutual information between an observation of a computer-based relay node of the overlay subgraph and information of a message not intended for said computer-based node is of calculable value.

2. The computer-based method of claim 1, wherein the information particular to the each computer-based relay node comprises for a computer-based relay node of a last layer of the overlay subgraph:
    a last-layer flag;
    a secret message flag indicating presence/absence of an optional secret message; and
    an optional secret message;
    and further comprising for a computer-based relay node not of the last layer of the overlay subgraph:
    node identifiers of next nodes; and
    corresponding coded packets to be forwarded by the each computer-based relay node to the next nodes.

3. The computer-based method of claim 2, wherein the optional secret message is present when the computer-based relay node is in a last layer of the overlay subgraph and wherein a field allocated to the optional secret message is filled with random symbols when the optional secret message is not present.

4. The computer-based method of claim 3, wherein the optional secret message is a cryptographic key and/or a symmetric key which allow a corresponding relay node to communicate privately with the computer-based source using messages encrypted via the cryptographic/symmetric key.

5. The computer-based method of claim 1, wherein the overlay subgraph is rectangular.

6. The computer-based method of claim 1, wherein the calculable value is zero or substantially zero.

7. The computer-based method of claim 1, wherein the generating further comprises:
    defining, via the computer-based source, packets content for each layer of the plurality of layers of the overlay subgraph recursively, starting from a last layer, wherein a packet content for a computer-based relay node of a layer is based on the message for the computer-based relay node and a corresponding node identifier; and
    based on the defining, generating, via the computer-based source, the first layer coded packets by coding together packets content for the each computer-based relay node with random keys, and splitting the random keys and coded content across packets sent to different relay nodes.

8. The computer-based method of claim 6, wherein the transmitting and the decoding further comprise:
   i) based on the transmitting, receiving a plurality of packets at a computer-based relay node of a first layer of the plurality of layers;
   ii) based on the receiving, stripping off, via the computer-based relay node, the corresponding node identifier from the packet content of each received packet;
   iii) based on the stripping, summing, via the computer-based relay node, the content of the plurality of packets;
   iv) based on the summing, obtaining the decoded message;
   v) based on the obtaining, extracting, via the computer-based relay node the coded packets to be forwarded;
   vi) based on the extracting, padding, via the computer-based relay node the coded packets with random symbols;
   vii) based on the padding, obtaining coded packets of the same size;
   viii) transmitting, via the computer-based relay node, the coded packets of the same size to a next layer of the plurality of layers;
   repeating steps i)-viii) for the next layer of the plurality of layers; and
   based on the repeating, decoding the message for each computer-based relay node via the each computer-based relay node.

9. The computer-based method of claim 8, wherein the plurality of packets is in correspondence of the width of the overlay subgraph.

10. The computer-based method of claim 1, wherein the computer-based source comprises a plurality of computer workstations connected via secure communication links.

11. The computer-based method of claim 10, wherein the plurality of computer workstations is in correspondence of the width of the overlay subgraph.

12. The computer-based method of claim 6, wherein last layer comprises computer-based sink nodes, and wherein the computer-based source transmits a secret message to the computer-based sink nodes anonymously via the overlay subgraph.

13. The computer-based method of claim 1, wherein a length of the overlay subgraph is defined by the number of the plurality of layers of the overlay subgraph, and wherein the length is two or more.

14. The computer-based method of claim 13, wherein the length of the overlay subgraph is selected randomly from a suitable probability distribution.

15. The computer-based method of claim 14, wherein the suitable probability distribution concentrates more on longer lengths and the longer lengths have a larger probability than shorter lengths.

16. The computer based method of claim 1, wherein the selecting via the computer-based source of the random subset is based on a geographic location of the available computer-based nodes such as to minimize a probability of an adversarial computer-based node in the random subset or to minimize a probability of colluding adversarial computer-based nodes in the random subset.

17. A computer-based method for data transfer over an overlay subgraph of computer-based nodes, the method comprising:
   providing an overlay subgraph of length l comprising a plurality of computer-based relay nodes arranged in l layers and communicating over a plurality of transmit and/or receive links, wherein each computer-based relay node of a layer i of the l layers shares a same secret random seed of l different random seeds with a computer-based source node;
   generating, via the computer-based source node, an invertible matrix $A_i$ based on the same secret random seed for each layer i of the l layers, wherein the invertible matrix $A_i$ is different for each layer i;
   preprocessing, via the computer-based source node, a sink message for a computer-based sink node at the last layer l of the l layers, by right-multiplying the sink message with matrix product $A_l^{-1} A_{l-1}^{-1} \ldots A_2^{-1} A_1^{-1}$, and obtaining a preprocessed sink message as a result;
   dividing, via the computer-source node, the preprocessed message into a plurality of packets and appending network coding headers comprising network coding operations associated to linear coding to each packet of the plurality of packets; and
   based on the appending, transmitting, through the l layers of the overlay subgraph the plurality of packets using linear coding at each layer, wherein each computer-based relay node of a layer i performs the linear coding and right-multiplies its received packets by the matrix $A_i$.

18. The computer-based method of claim 17, wherein the right-multiplication is performed before or after the linear coding.

19. The computer-based method of claim 17 or claim 18, wherein based on the linear coding and the right-multiplication of its received packets, the each computer-based relay node of the layer i transmits a plurality of random linear combinations of resulting packets and updates the network coding headers accordingly.

20. The computer-based method of claim 19, wherein the computer-based sink node right-multiplies its received packets with its matrix $A_l$ and inverts network coding operations specified in the network coding headers.

21. The computer-based method of claim 17, wherein the overlay subgraph is rectangular and wherein each layer of the l layers comprises d computer-based relay nodes of the plurality of computer-based relay nodes, wherein d is equal to or larger than two.

22. The computer-based method of claim 17, wherein the transmitting over the overlay subgraph is in correspondence of a unicast session of a plurality of unicast sessions, wherein each unicast session of the plurality of unicast sessions transmits over a similar overlay subgraph sharing one or more computer-based relay nodes from the plurality of computer-based relay nodes.

23. The computer-based method of claim 17, wherein the overlay subgraph is constructed based on the computer-based method of claim 1.

24. A computer-based communication network for anonymous peer-to-peer (P2P) communication, comprising:
   a computer-based source configured to communicate with a plurality of computer-based nodes of the computer-based communication network via a plurality of transmit and/or receive links, wherein:
   the computer-based source is configured to execute a coding algorithm to generate a plurality of messages used to construct an overlay subgraph of nodes of width larger than two based on a randomly selected subset of computer-based relay nodes from the plurality of computer-based nodes, wherein messages are provided to the randomly selected subset of computer-based relay nodes via transmitted packets through the plurality of transmit and/or receive links, such as a mutual information between an observation of a computer-based node of the plurality of computer-based nodes and part of information of a message from the plurality of messages not intended for said computer-based node is of calculable value.

25. The computer-based communication network of claim 24, wherein the transmitted packets are of a constant size.

26. The computer-based communication network of claim 25, wherein the coding algorithm comprises:
   selecting, via the computer-based source, a plurality of computer-based relay nodes based on a random subset of the plurality of computer-based nodes;
   based on the selecting, arranging, via the computer-based source, the selected computer-based relay nodes into the overlay subgraph of nodes of width larger than or equal to two, comprising a plurality of layers;
   based on the selecting and the arranging, creating, via the computer-based source, the plurality of messages for the selected computer-based relay nodes, wherein a message of the plurality of messages comprises information particular to a computer-based relay node of the selected computer-based relay nodes;
   based on the creating, generating, via the computer-based source, a first layer coded packets;
   based on the generating, transmitting to a first layer of the plurality of layers of the overlay subgraph, coded packets of a same size via the computer-based source.

27. The computer-based communication network of claim 26, wherein the generating further comprises:
   defining, via the computer-based source, packets content for each layer of the plurality of layers of the overlay subgraph recursively, starting from a last layer, wherein a packet content for a computer-based relay node of a layer is based on the message for the computer-based relay node and a corresponding node identifier; and
   based on the defining, generating, via the computer-based source, the first layer coded packets by coding together packets content for the each computer-based relay node with random keys, and padded with random symbols.

28. The computer-based communication network of claim 27, wherein a computer-based relay node of the plurality of computer-based relay nodes is configured to execute a relay algorithm comprising:
   receiving, via the computer-based relay node, a plurality of packets from a lower layer of the plurality of layers;
   based on the receiving, stripping off, via the computer-based relay node, the corresponding node identifier from the packet content of each received packet;
   based on the stripping, summing, via the computer-based relay node, the content of the plurality of packets; and
   based on the summing, obtaining the message for the computer-based relay node, wherein the message for a computer-based relay node not at a last layer of the plurality of layers of the overlay subgraph comprises coded packets to be forwarded to a next layer.

29. The computer-based based communication network of claim 27, wherein the relay algorithm of a computer-based relay node not at the last layer of the plurality of layers of the overlay subgraph further comprises:
   extracting, via the computer-based relay node, the coded packets to be forwarded;
   based on the extracting, padding, via the computer-based relay node, the coded packets to be forwarded with random symbols;
   based on the padding, obtaining coded packets of the same size; and
   transmitting, via the computer-based relay node, the coded packets of the same size to a next layer of the plurality of layers.

30. The computer-based method of claim 24, wherein the calculable value is zero or substantially zero.

* * * * *